Aug. 6, 1968 C. KOWALESKI 3,396,244

HANDSET MOUNTED ALTERNATE ACTION SWITCHHOOK AND ASSOCIATED MODE INDICATOR MEANS

Filed Dec. 1, 1964 3 Sheets-Sheet 1

INVENTOR
C. KOWALESKI
BY [signature]
ATTORNEY

United States Patent Office 3,396,244
Patented Aug. 6, 1968

3,396,244

HANDSET MOUNTED ALTERNATE ACTION SWITCHHOOK AND ASSOCIATED MODE INDICATOR MEANS

Clarence Kowaleski, Rahway, N.J., assignor to Bell Telephone Laboratories, Incorporated, New York, N.Y., a corporation of New York Filed Dec. 1, 1964, Ser. No. 415,024
8 Claims. (Cl. 179—100)

ABSTRACT OF THE DISCLOSURE

A telephone handset is enhanced by the addition of a push-push switch which operates a handset-mounted switchhook connected in series with the usual base switchhook. In one position, the handset switch closes the line circuit and also energizes a mode-indicator lamp; in the other, the switch opens the line circuit and extinguishes the lamp. The preferred switch construction is a lightweight rocker. An arm-and-lever mechanism assures that when the handset is cradled, the handset-mounted switchhook is placed "off-hook."

This invention relates to telephone station apparatus of the type having a handset and, in particular, to certain novel switching means located in the handset. The invention is especially applicable to telephone substations in which the dialing means is incorporated into the handset.

Most telephone substations are composed essentially of a handset for housing a receiver and transmitter, and a base containing dialing means, ringer, switchhook, network and a handset cradle. When cradled, the handset depresses a plunger that maintains the switchhook in its "on-hook" position wherein the line circuit is open and the ringer circuit closed. In conventional practice, removal of the handset from the cradle releases the switchhook plunger, placing the switchhook "off-hook" to close the line circuit and signal for dial tone. The set may include a lamp that energizes in response to the "off-hook" condition to illuminate the dial. A continuous depression of the switchhook plunger either by hand or by replacing the handset in its cradle in accordance with standard practice opens the line circuit.

A dial-in handset telephone differs from the above-described set principally in that the dialing means is located not in the base but in the handset. Such a telephone set is described in the copending application of L. N. Wilder, Ser. No. 364,974. In this set the switchhook is conveniently contained in the base and is the functional equivalent of that contained in the set described earlier.

A principal advantage of a dial-in handset telephone lies in its enhanced dialing convenience. The user may employ the handset in whatever dialing position is convenient, limited only by the handset cord length. Further user convenience is achieved through the inclusion in the handset itself of a pushbutton switch connected in series with the line switch located in the base-mounted switchhook such as is described in the cited copending application, which gives the user the means for terminating a first connection and acquiring dial tone for a second connection without having to replace the handset on the base.

Inasmuch as a dial-in handset enables the user to dial at a location remote from the base, convenience dictates that such a phone should be entirely independent of the base-mounted switchhook. Specifically, it should be unnecessary for a user to replace the handset in the cradle or to otherwise depress the switchbook plunger to achieve and maintain the "on-hook" mode. Either mode should be selectable at the handset itself; and whichever mode is selected should persist without any further user effort as long as the handset remains "off-hook." If the handset is left in its "on-hook" mode when replaced in its cradle, it should revert automatically to the "off-hook" mode so that the next user who might be unaware of the handset mode selector would not assume that the set were inoperative. Moreover, when such a switchhook control is included in a handset, an indicator that will tell a user the operational mode of the set would further enhance user convenience and would also caution against leaving the set inadvertently in the "off-hook" mode. Any such means to accomplish these functions would have to be small enough to fit into existing handsets; and would, of course, have to be very rugged, reliable, and inexpensive.

Accordingly, an object of the invention is to enhance the versatility of telephone substations which employ handsets.

Another object of the invention is to enable a dial-in handset telephone to be operated independently of the base-monuted switchhook and at a position remote from same.

A further object of the invention is to control the operational mode and the mode indicator means of a dial-inhandset telephone from within the handset itself, employing highly compact, inexpensive and reliable apparatus.

A further object of the invention is to insure that a handset having such a two-position mode control therein is automatically in the "off-hook" mode whenever the handset is removed from the cradle, regardless of what its mode was when last replaced.

These and other objects are achieved in accordance with the invention by a manual alternate action switch in the handset which opens and closes the line and lamp circuits to select and maintain "on-hook" and "off-hook" mode, and which is reset to the "off-hook" mode in response to the returning of the handset to the cradle.

In an illustrative embodiment of the present invention, a lightweight miniature rocker with commutator segments to provide closures for each of two paths is mounted in the handset. The first path is wired in series with the base-mounted line circuit switch, and the second path is wired in series with the set's light. A detent maintains the rocker in the "on-hook" or the "off-hook" position. A pushbutton conveniently located on the recevier shelf supports a pivotally mounted driver that operates the rocker alternately back and forth between its two positions. An actuating arm, operated by a restoring button protruding from the receiver shelf, is linked to the rocker to urge the rocker to its "off-hook" position whenever the handset is cradled. Thus, the rocker will always be in its "off-hook" position when the handset is next used.

Accordingly, a feature of the invention relates to the inclusion in a dial-in handset telephone of a miniature pushbutton-operated alternate action switch which allows the user to control the operational mode of the set while the handset remains off its cradle.

Another feature of the invention relates to the inclusion in a handset of the type described of visual indicator means responsive to the operational mode of the set to appraise a user of the mode.

A further feature of the invention relates to a manually operated switch in a dial-in handset telephone that gives the user remote control of the set independent of the base-mounted switchboard, including a means for ensuring that the handset will always be in the "off-hook" mode when removed from the cradle.

These and other features of the invention will be apparent from a more detailed description and from the accompanying drawing in which.

Figure 1A:
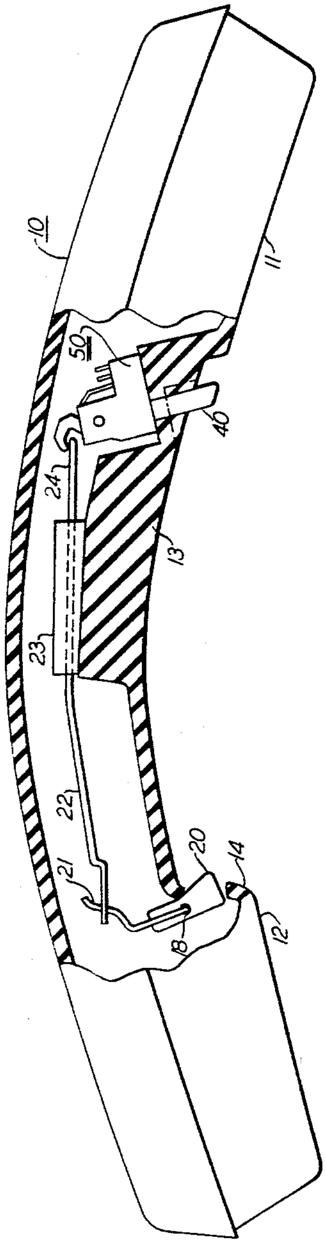
FIG. 1A shows schematically a handset with the novel switch in place.
Figure 1B:
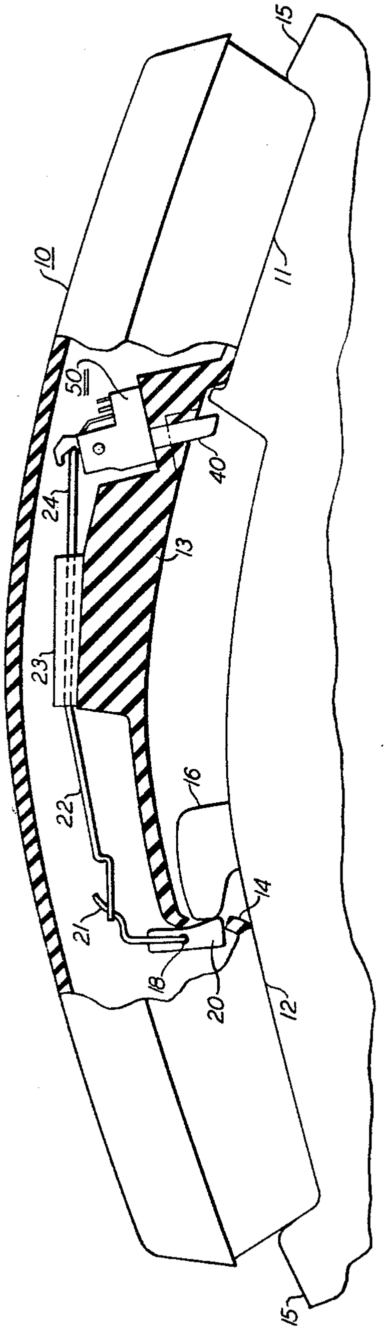
FIG. 1B is similar to FIG. 1A and shows the novel reset mechanism fully extended.
Figure 2:
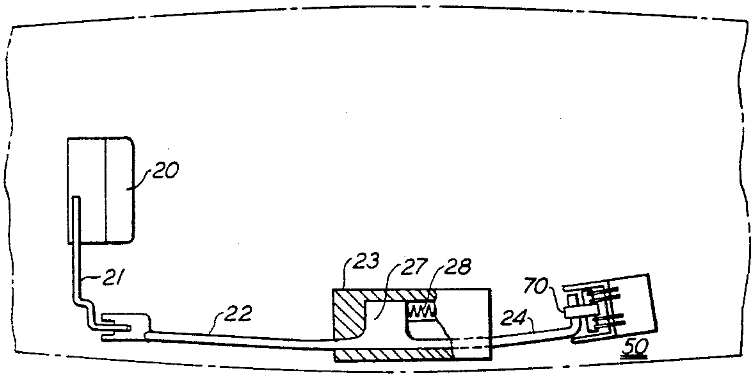
FIG. 2 is a schematic partial cutaway top view of the handset showing the switch mounted therein.

Referring first to FIGS. 1A and 1B, the handset 10 having a receiver end 11 and a transmitter end 12 is shown resting on cradle 15 (FIG. 1B) which is indicated schematically. Adjacent end 11 is receiver shelf 13 beneath which the novel alternate action switch, generally designated at 50, is mounted to one side as shown in FIG. 2. End 12 includes an inner wall 14 through which a pivotally mounted actuating arm 20 protrudes. For reasons later to be described, in accordance with the invention, when handset 10 is placed in cradle 15 arm 20 contacts switchhook plunger 16 protruding from cradle 15, and pivots around a rod 18. Rod 18 has a finger 21, shown in FIG. 2. A link 22, contacting finger 21 and mounted for reciprocal movement in guide 23, includes an end 24 that contacts a portion of switch 50 as shown in FIG. 1B. Link 22 includes a tab 27 riding in guide 23, and is loaded by a spring 28 to urge the linkage into the unoperated position shown in FIG. 1A.

Figure 3:
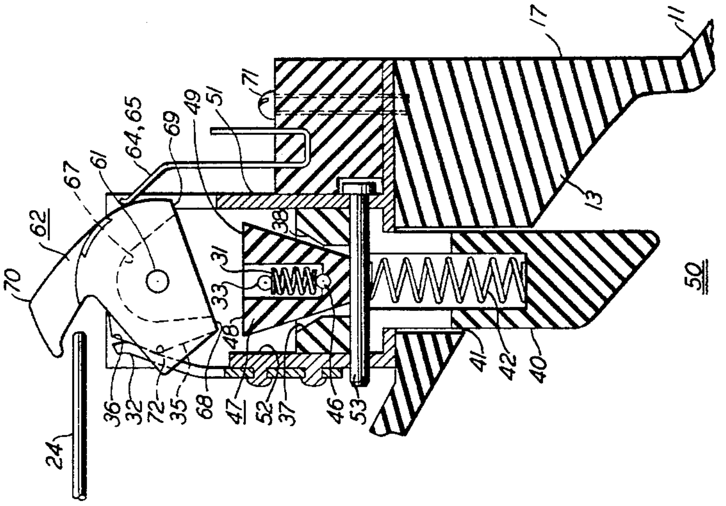
FIG. 3 is a sectional front view showing the switch unoperated.

FIG. 3 shows in sectional view the workings of switch 50, and the end 24 of link 22. A pushbutton 40 protrudes through an orifice 41 in the handset receiver shelf 13. A switch frame 51 is affixed by some means such as fastener 71 to rib 17 that is a convenient integral part of handset 10. Frame 51 includes an inner guide portion 52 for a slider 43 that forms the other end of pushbutton 40. An abutment 53 fixed across the lower portion of guide 52 supports a spring 42 that biases pushbutton 40. The shape of inner guide 52 and the corresponding shape of slider 43 may be circular, square, rectangular or any other desired shape. Slider 43 has an axial aperture 44 that includes first and second flats 37, 38 in each of two opposite sides. A shaft 46, mounted to slider 43 across aperture 44 and substantially parallel to the flats 45, pivotally supports a driver 47. Driver 47 includes first and second ends 48 and 49, respectively. Internal spring 31, shown in FIG. 3, seating against a rest 33 that is integral with driver 47, provides a frictional drag against shaft 46 to prevent faulty action of the driver 47.

Figure 6:
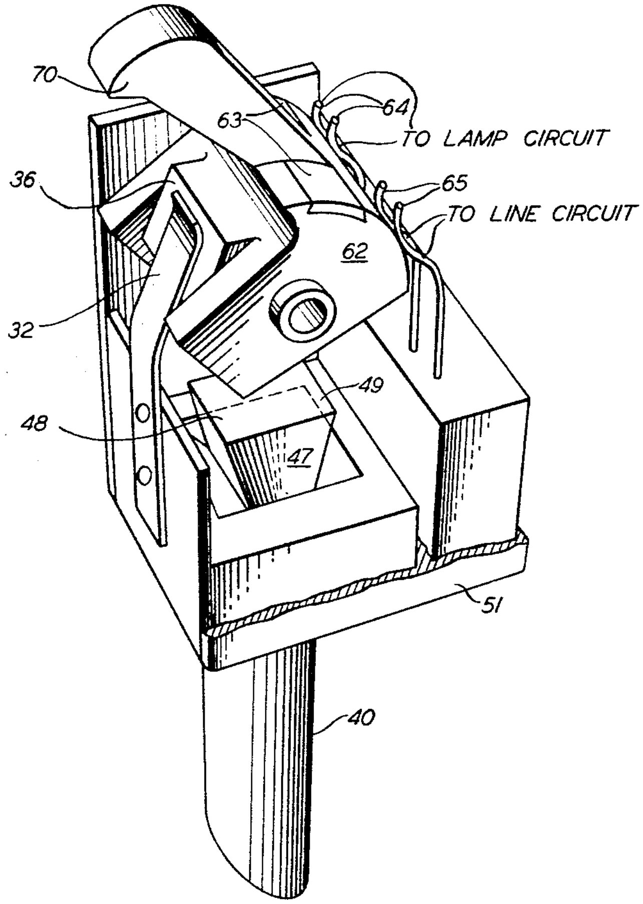
FIG. 6 is a perspective of the switch showing placement of contacts.

Mounted above driver 47 on an axle 61 secured to frame 51, and essentially parallel to shaft 46, is a rocker 62 having commutator segments 63 best seen in FIG. 6. These segments provide electrical closure paths for a contact 64 that controls a dial lamp circuit (not shown) and a contact 65 that controls the line circuit. The line and lamp circuits are, as usual, also opened and closed by action of the base-mounted switchhook (not shown) to which contacts 64 and 65 are series connected.

Rocker 62 includes a cam surface having a first face 35 and a second face 36 separated by a nub 72. The underside of rocker 62 includes a hollowed out portion 67 thereby defining a first shoulder 68 and a second shoulder 69 of rocker 62. Rocker 62 includes an arm 70 that is contacted by end 24 of link 22 shown in FIGS. 1A and 2, in a manner that will be described soon.

Figure 5:
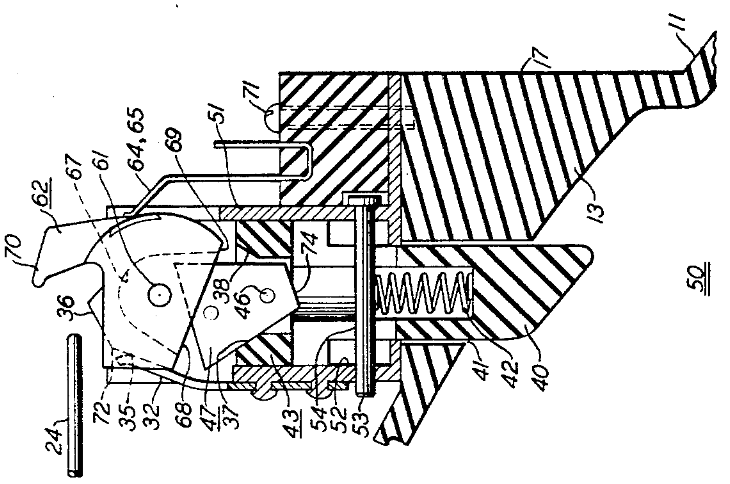
FIG. 5 is similar to FIG. 4 and shows the switch fully operated.
Figure 4:
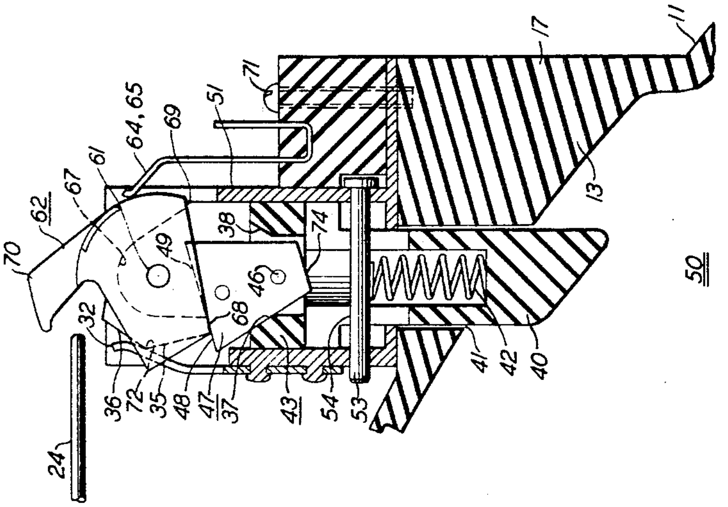
FIG. 4 is similar to FIG. 3 and shows the switch partially operated.

The operation of alternate action switch 50 is as follows. In the unactuated position shown in FIG. 3, pushbutton 40 extends beyond receiver shelf 13 as driver 47 rests on abutment 53 in a normal, upright position. Depressing of pushbutton 40 moves driver 47 upwardly until as shown in FIG. 4 its first end 48 contacts shoulder 68 of rocker 62. Rocker 62 is thereby pivotally urged in a clockwise direction about axle 61, against the force of a detent 32 fastened to frame 51 and which at the time is impinging upon first face 35 of the cam surface. As driver 47 continues upward it is caused by the off-center force upon its end 48 to pivot in a counterclockwise direction around its shaft 46 until stopped by its tapered side contacting first flat 37 of slider 43. A very slight further depression of pushbutton 40 pivots rocker 62 sufficiently so that detent 32 passes from face 35 and over nub 72 onto face 36, thereby snapping rocker 62 into its second position as shown in FIG. 5. Contacts 64 and 65 are closed by the respective segments 63, the lamp (not shown) it lit and, provided the base switchhook is in the "off-hook" mode, the set is connected to the line.

When pushbutton 40 is released it returns through the action of spring 42 to its normal position. When bottom surface 74 of driver 47 contacts the flat surface of abutment 53, driver 47 is returned to its normal, upright position, shown in FIG. 3.

Successive depressing and releasing of pushbutton 40 causes rocker 62 to rock back and forth alternately between the positions shown in FIG. 3 and FIG. 5. The steps causing rocker 62 to return from its second position (FIG. 5) to its first position (FIG. 3) are similar in every respect to those already described. Briefly, driver 47 is pushed upward and its second end contact 49 contacts second shoulder 69 of rocker 62. Rocker 62 begins to pivot in counterclockwie direction against the urging of detent 32. Driver 47 pivots clockwise due to the off-center reactive force. Driver 47 is stopped by second flat 38 and shortly thereafter nub 72 snaps past the detent 32 causing rocker 62 to snap once again into the first position, shown in FIG. 3, wherein the segments 63 are removed from the contacts 64 and 65 thereby opening the line and lamp circuits.

The hollowed-out portion 67 or rocker 62 serves the purpose of enabling rocker 62 to snap into a new position without being stopped by the opposite driving surface of driver 47. This feature of the invention is illustrated best in FIG. 5, in which it is seen that rocker 62 has just snapped to its "off-hook" position but second end 49 of driver 47 is protruding well into rocker 62 because driver 47 has not yet returned to its normal position shown in FIG. 3. Rocker 62 cannot be contacted again by driver 47, however, until pushbutton 40 has been fully released, retracting driver 47 from hollow 67 while still in its full pivoted position. Bottom surface 74 of driver 47 finally contacts abutment 53, as already described, so as to place driver 47 in its normal, upright position, wherein first end 48 is again ready for engaging relation with shoulder 69.

In accordance with the invention, whenever the handset is replaced on its cradle 15, switch 50 and specifically rocker 62 is placed in the "off-hook" position in which commutator segments 63 have closed the lamp contacts 64 and line contacts 65 as shown in FIG. 5.

Referring again to FIGS. 1A, 1B, and 2 when handset 10 is replaced on cradle 15 the arm 20 contacts the switchhook plunger 16 causing link 22 to move toward the arm 70 of rocker 62. If rocker 62 happens to be in its "on-hook" position such as shown in FIG. 3, then it will be pivoted clockwise by the advancing end 24 of link 22, sufficiently to advance nub 72 across the action of detent 32 so that the rocker will assume its "off-hook" position shown in FIG. 5. This is achieved, it should be noted, without depressing or releasing pushbutton 40 and without impinging upon driver 47 which all during this time is in its normal, upright position.

If rocker 62 was already in its "off-hook" position as shown in FIG. 5 at the time the handset was replaced in its cradle, then although the arm 20 and its associated linkage will still actuate, the motion will result in no change in the position of rocker 62 since the latter was already in the preferred position. This mechanism ensures that the handset will always be in the "off-hook" mode when it is removed from its cradle 15. This feature is a convenience to the next user because he will never have to obtain the handset "off-hook" mode by depressing the pushbutton. Further, the mechanism precludes the possibility of a user unfamiliar with the pushbutton mechanism from assuming that the set is inoperative, as he might if no reset were provided and the previous user had returned the set to its cradle with the handset in the "on-hook" mode in which the line contacts are open.

Other arrangements for the actuating linkage are, of course, possible. For example, a first magnet could be located in the handset base adjacent the transmitter end, opposed by a second magnet of similar polarity located in the handset and associated with the linkage. Link 22 could be urged forwardly as in FIG. 18 on the returning of handset 10 to cradle 15, and would return to its normal position when the handset is next removed from cradle 15.

It is to be understood that the above-described arrangements are illustrative of the application and the principles of the invention. Numerous other arrangements may be devised by those skilled in the art without departing from the spirit and scope of the invention.

What is claimed is:

1. In a telephone handset in combination:

(a) switching means for effecting a connection with a telephone line, said means having a first position for making such connection and a second position for opening said connection;

(b) means including a manually operable pushbutton responsive to successive operations thereof for alternating said switching means between said first and second positions and for retaining said switching means in each successive position until said manual switch is next operated;

(c) means responsive to the replacement of said handset in a cradle for urging said switching means into said first position whereby said handset will be enabled when next removed from said cradle; and (d) mode indicator means responsive to the placing of said switching means in said first position for indicating the making of said connection, and further responsive to the placing said switching means in said second position for indicating the opening of said connection.

2. A telephone set comprising: a base, a line circuit, power source, a base-mounted switchhook connected to said line circuit and to said source, a handset comprising a mode indicator lamp connected through said switchhook to said source and a pushbutton switch comprising a first serial contact between said switchhook and said line circuit and a second serial contact between said switchhook and said lamp, and means responsive to successive depressings of said pushbutton for alternately opening and closing said first and second contacts; whereby when said switchhook is "off-hook" said line circuit and said lamp are controlled through said pushbutton switch, a handset cradles in said base and means responsive to the placement of said handset on said cradle for closing said first and second contacts of said pushbutton switch, thereby to ensure that said handset will be enabled when next removed from said cradle.

3. A telephone handset comprising: a base, a line circuit, a power source, a base-mounted switchhook connected to said line circuit and to said source, a handset comprising dialing means mounted therein and connected through said switchhook to said line circuit, a mode indicator lamp connected through said switchhook to said source, a pushbutton switch comprising a first serial contact between said switchhook and said line circuit and a second serial contact between said switchhook and said lamp, and means responsive to successive depressings of said pushbutton for alternately opening and closing said first and second contacts; whereby when said switchhook is "off-hook" said line circuit and said lamp are controlled through said pushbutton switch thereby to facilitate use of said dialing means without having to manipulate said base-mounted switchhook.

4. A telephone set in accordance with claim 3, further comprising a handset cradle in said base and means responsive to the placement of said handset on said cradle for closing said first and second contacts of said pushbutton switch, thereby to ensure that said handset will be enabled when next removed from said cradle.

5. In a telephone set having a handset with a pushbutton and a mode indicator lamp, and a base with a handset cradle and a switchhook therein for opening and closing the line circuit and the indicator lamp circuit, apparatus for selecting and maintaining the operational mode of said substation from the handset thereof when said switchhook is "off-hook," and for indicating visuallly said mode, comprising in combination:

(a) switching means in said handset and including first and second contact pairs connected, respectively, with said line and lamp circuits, said switching means having a first position wherein said contact pairs are closed and a second position wherein said contact pairs are open;

(b) pivotable means responsive to successive depressings of said pushbutton for alternating and switching means between said first and second positions;

whereby when said switchhook is "off-hook" and said switching means is in said first position, said line and lamp circuits are closed thereby enabling said substation and lighting said indicator lamp to signify said enabling; and when said switching means is in said second position said line and lamp circuits are open thereby disabling said substation and extinguishing said lamp to signify said disabling; and (c) means responsive to the replacement of said handset on said cradle for urging said switching means into said first position whereby said contact pairs are closed thereby to ensure the handset will be enabled when next removed from said cradle.

6. Apparatus in accordance with claim 5 wherein said switching means includes a pivotally mounted nonconductive rocker within said handset, said rocker having first and second positions, detent means for urging said rocker into said first or second position and spaced conductive segments integral with said rocker for bridging said contact pairs when said rocker is in said first position and for opening said contact pairs when said rocker is in said second position.

7. Apparatus in accordance with claim 6 wherein said rocker has a first and a second shoulder and said pivotable means includes a spring-loaded plunger slidably mounted within said handset for reciprocal motion toward and away from said rocker shoulders, a driver pivotally mounted on said plunger and having a first end for driving relation with said first rocker shoulder and a second end for driving relation with said rocker shoulder, means maintaining said driver in substantially upright position when said pushbutotn is undepressed, first and second limiting means to limit the pivotal motion of said plunger, whereby a first depression of said plunger brings said first plunger end in contact with said first rocker shoulder when said rocker is in said first position thereby causing said rocker to pivot toward its second position and causing said driver to pivot in the opposite direction until it reaches said first limiter whereupon said rocker is urged into its second position by action of said detent, said plunger is withdrawn with said driver in its fully pivoted position so that its second end clears the second shoulder of said rocker, said driver being returned to its normal position upon the release of said pushbutton; and upon the next depression of said pushbutton said second end of said driver contacts said second shoulder of said rocker thereby pivoting said rocker toward its first position and pivoting said driver in the opposite direction until said driver reaches said second limiting means whereupon said rocker is urged into its said first position by action of said detent; said driver being retracted in its fully pivoted position thereby passing its first driving end clear of said first driving shoulder.

8. Apparatus in accordance with claim 7 wherein said rocker has a finger and said handset further includes a pivotally mounted arm having first and second ends, said first end protruding from the transmitter end for contact with the plunger of said base switchhook when said handset is replaced in said cradle causing said arm to pivot, a spring-loaded slidably mounted rod having one end thereof connected to said second end of said arm and a second end thereof contacting said rocker finger, thereby urging said rocker into said closed position when said handset is recradled, said rod retracting clear of said rocker when said handset is next removed from said cradle.

References Cited

UNITED STATES PATENTS

| | | | |
|---|---|---|---|
| 1,051,219 | 1/1913 | Grabau | 200—68 |
| 2,415,297 | 2/1947 | Linton | 200—159 |
| 2,916,563 | 12/1959 | Bernstein | 179—167 |

WILLIAM C. COOPER, *Primary Examiner.*

A. H. GESS, *Assistant Examiner.*